United States Patent [19]

Aoki

[11] E Re. 29,982

[45] Reissued May 1, 1979

[54] THREE OUTPUT LEVEL LOGIC CIRCUIT

[75] Inventor: Edward M. Aoki, Cupertino, Calif.

[73] Assignee: Signetics Corporation, Sunnyvale, Calif.

[21] Appl. No.: 790,569

[22] Filed: Apr. 25, 1977

Related U.S. Patent Documents

Reissue of:

[64] Patent No.: 3,602,733
Issued: Aug. 31, 1971
Appl. No.: 816,662
Filed: Apr. 16, 1969

[51] Int. Cl.[2] ..... H03K 19/08

[52] U.S. Cl. ..... 307/209; 307/217; 307/243; 328/99

[58] Field of Search ..... 307/209, 214, 215, 217, 307/218, 241-243; 328/94, 99

[56] References Cited

U.S. PATENT DOCUMENTS

| | | | |
|---|---|---|---|
| 3,207,922 | 9/1965 | Gruodis | 307/209 |
| 3,212,009 | 10/1965 | Parker | 328/37 |
| 3,333,113 | 7/1967 | Cole | 307/217 |
| 3,381,088 | 4/1968 | Lentz et al. | 178/70 |
| 3,431,433 | 3/1969 | Ball et al. | 307/221 |
| 3,467,948 | 9/1969 | Barlow et al. | 340/172.5 |
| 3,492,496 | 1/1970 | Callan | 307/209 |

OTHER PUBLICATIONS

IBM Technical Disclosure Bulletin, J. B. Atkins, "Inhibited Logic Circuit" vol. 7, No. 9, Feb., 1965, p. 848.
Electronic Design, Jun. 6, 1968, p. 85.
R. G. Short, "MOS FET Shift Register Element" IBM Technical Disclosure Bulletin, vol. 9, No. 8, Jan., 1967, pp. 1047-1049.

*Primary Examiner*—John Zazworsky
*Attorney, Agent, or Firm*—Jerry A. Dinardo; Frank R. Trifari; Jack Oisher

[57] ABSTRACT

A three-output level logic circuit in which in addition to zero and one binary logic levels a third off-logic level is provided in which the output impedance is relatively high to in effect isolate the switching circuit from a common line to which it is connected thereby allowing several switching circuits to be used in common without deleteriously affecting switching speed in an overall computer or calculator unit.

9 Claims, 5 Drawing Figures

THREE OUTPUT LEVEL LOGIC CIRCUIT

Matter enclosed in heavy brackets [ ] appears in the original patent but forms no part of this reissue specification; matter printed in italics indicates the additions made by reissue.

BACKGROUND OF THE INVENTION

The present invention is directed to a three-output level logic circuit and more particularly to a circuit in which the third logic level has no affect on a driven circuit.

In a computer or calculator it is desired to common the outputs of several switching components onto a single data line. This reduces the necessary hardwire connections.

Normally, however, the common line is unduly loaded by the components and therefore the number of components must be limited. Where coupling units are used for isolating each component the switching speed of the computer is lowered; this is partially due to impedance mismatch problems relative to the positive and negative going edges of the logic pulses.

OBJECTS AND SUMMARY OF THE INVENTION

It is, therefore, a general object of the invention to provide a three-output level logic circuit where the third level provides effective isolation of the circuit from a common line.

It is another object of the invention to provide a circuit as above which allows the commoning of any number of such circuits on a single data line.

In accordance with the above objects there is provided a three-output level logic circuit having first and second input means. First switching means are responsive to applied signals on the first input means for selectively switching an output terminal of the logic circuit to first or second output levels. Second switching means are provided which are responsive to an applied signal on the second input means for causing the first switching means to assume a third condition to provide a third output level at the output terminal which exhibits a high impedance relative to the first and second output levels.

DETAILED DESCRIPTION OF THE PREFERRED EMBODIMENT

Figure 1:
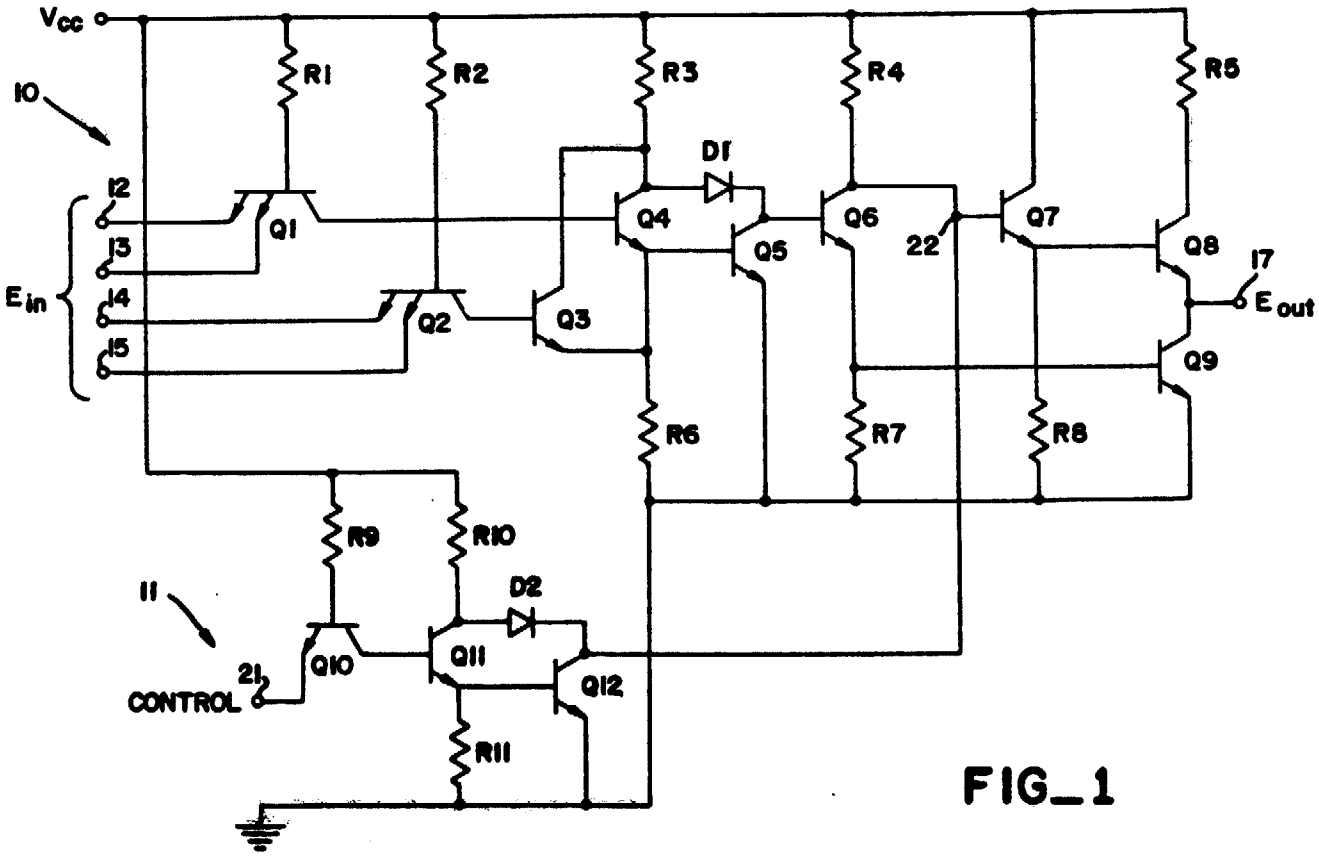
FIG. 1 is a circuit schematic embodying the present invention.

Referring first to FIG. 1, the logic circuit of the present invention generally includes a first switching circuit 10 having transistors Q1 through Q9 and a second switching circuit 11 including transistors Q10 through Q12. First switching circuit 10 has four input terminals 12, 13, 14 and 15 designated $E_{IN}$ and an output terminal 17 designated $E_{OUT}$.

From an overall standpoint, if all of the input voltages $E_{IN}$ are high or a binary one, the output terminal $E_{OUT}$ will be high; similarly if all input voltages on terminals 12 through 15 are low or binary zero, then the output voltage level on terminal 17 will also be low. More particularly, however, input terminals 12 and 13 are coupled to a dual emitter transistor Q1 which functions as a NAND gate. If the voltage signals on terminals 12 and 13 are both high, then current can flow through the collector of Q1 driving the remainder of the circuit. If either of the inputs 12 or 13 is low, then collector current is in essence robbed from Q1 and no drive function is performed. The same is true of Q2. Thus, a low signal input represents, in effect, a current sink and a high input a current source.

Figure 2A:
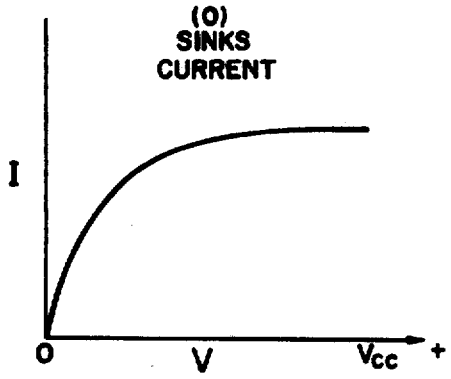
FIGS. 2A, 2B and 2C are characteristic curves useful in understanding the present invention.
Figure 2B:
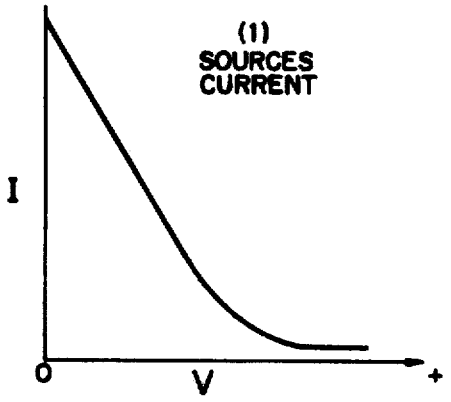

The zero and one logic levels are illustrated in FIGS. 2A and 2B respectively. These characteristic curves are typical of a binary logic element. Note that in both of the logic states the output impedance characteristic presented by output terminal 17 will have a significant effect on the driven circuit.

The normal operation of first switching circuit 10 absent any effect created by switching circuit 11 is as follows. In the case where all $E_{IN}$ voltages on terminals 12 through 15 are near a zero state the transistors Q1 and Q2 will be in an on or saturation state. Thus, any current through the base resistor R1 from the common voltage supply $V_{CC}$ which is a nominal +5 v., will be pulled from the base input of transistor Q4 and similarly current will be pulled from the base input of transistor Q3 by saturated transistor Q2. Thus, both Q3 and Q4 will be in a nonconductive or zero state. The collector of transistor Q4, since the transistor itself is not conductive, will be close to $V_{CC}$ through resistor R3, and its emitter will be close to ground. With no voltage applied between the base and emitter of transistor Q5 its collector will be in a high state. Diode D1 coupling the collector of transistor Q5 to the collector of transistor Q4 is for antisaturation purposes in that it limits current to provide for faster switching.

With the collector of Q5 high, current is allowed to flow from voltage source $V_{CC}$ through resistor R3 and diode D1 into the base of transistor Q6. Q6 is thus activated into a saturated state with current going through resistor R4 to transistor Q6 through a second resistor R7 to ground. The base of transistor Q7 will be pulled toward ground although not reaching it because of resistor R7. However, because of the emitter resistor R8, transistor Q7 will not be activated and concomitantly transistor Q8 will remain in a nonconductive or inactive condition. However, since current is flowing to the emitter of Q6, transistor Q9 is activated into saturation and causes output terminal 17 to assume a current sink or zero logic level as shown in FIG. 2A.

With the $E_{IN}$ inputs on terminals 12 through 15 all high, the output terminal 17 is also high. This is the binary one logic state. In this condition the emitters of transistors Q1 and Q2 are effectively disabled and current now flows through R1 and R2 respectively into the bases of Q4 and Q3 placing them in a conductive condition. In this condition both of the emitters of Q3 and Q4 are conducting current through the resistor R6 to ground. This places Q5 in a conductive or active condition which pulls the current out of the base of Q6 to place it in an inactive condition. Transistors Q3 and Q4 thus serve the function of a NOR gate.

With Q6 in a nonconductive condition, current can now flow through resistor R4 into the base of Q7 placing Q7 in a conductive or saturated condition. Q8 is activated by Q7 to cause the output terminal 17 to be placed in a high or binary one state. In other words, the output terminal 17 can now source current through resistor R5. This resistor is a short circuit limiting resistor. Transistor Q7 serves as an emitter follower in the Darlington type configuration of transistors Q7 and Q8. At this high or binary one level transistor Q9 however remains inactivated or in a nonconductive condition since the emitter of Q6 is in a zero or close to ground state. Thus, no base input signal is supplied to Q9.

As thus far described, the switching circuit represented by circuit portion 10 is a typical logic circuit having normal NAND, NOR and inverter functions. It is apparent from observation of the output characteristics of FIGS. 2A and 2B that in both of its logic levels or conditions the output terminal 17 has a definite [affect] *effect* on any driven circuit.

Figure 2C:
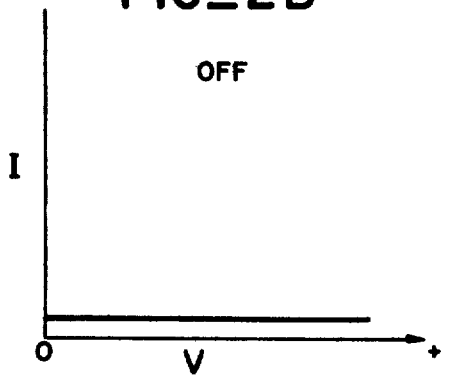

In accordance with the invention, the second switching means 11 is responsive to an applied signal on control input terminal 21 to cause output terminal 17 to assume a third logic level as shown in FIG. 2C. This is, in effect, an off condition where the output terminal presents a very high output impedance. In this condition, both of the output transistors Q8 and Q9 are nonconductive or inactivated. Thus, the output terminal 17 is, in effect, a floating terminal so that the entire logic circuit is effectively electrically disconnected from any common circuit to which it may be physically (as by wire) connected.

More particularly, a "high" control signal on terminal 21 allows transistor Q11 to be activated which in turn activates transistor Q12 which has its collector coupled to a point 22 of first switching circuit 10. This point is the coupling point between the base input of transistor Q7 and the collector output of transistor Q6. With transistor Q12 in saturation, it effectively places a short to ground on the base of Q7 and the collector of Q6. This is a very low impedance condition. When this occurs the base collector diode of Q6 is forward biased and current flows from the base of Q6 through the collector, and then through saturated Q12 to ground. Therefore, all drive to the emitter of Q6 is shunted or eliminated. Q6 is placed in a nonconductive condition and no current can drive Q9 thus also placing it in a nonconductive or inactivated condition. Similarly the base input drive to Q7 is also eliminated or shunted, thus placing Q8 in an inactivated or nonconductive condition. Thus, it is apparent that the second switching circuit 11 places both transistors Q8 and Q9 in an inactivated or nonconductive condition irrespective of whether the switching circuit is in its zero or one condition.

The actual operation of second switching circuit 11 is similar to the first stage of first switching circuit 10.

Figure 3:
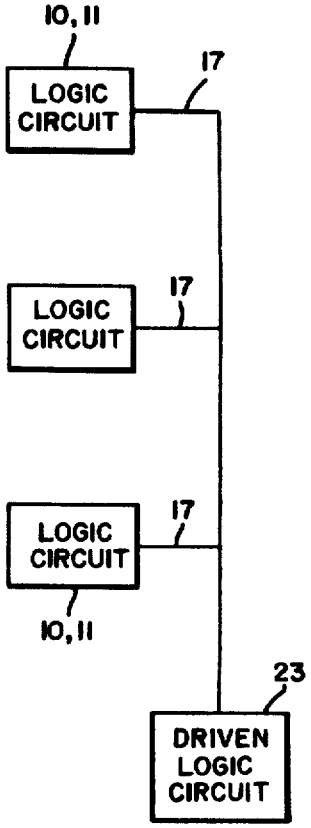
FIG. 3 is a block diagram showing a preferred use of the invention.

Thus, the present invention provides a three-level output logic circuit which in the third level of logic provides an off condition which effectively isolates the logic circuit from any common line. This allows for greater numbers of logic circuits 10, 11 to be tied on to a common line as illustrated in FIG. 3 where a driven logic circuit 23 is coupled to the line. When one of the logic circuits is not communicating binary information, it is placed in its third high impedance level. This preserves the high frequency switching performance of the overall system.

I claim:

1. In a logic circuit having first and second signal-receiving input means and an output terminal, said output terminal being adapted to be connected to a driven logic circuit, first switching means connected to said first signal-receiving input means and to said output terminal for selectively switching between first and second conditions in response to application of a signal to the first signal-receiving input means to provide first or second output levels on said output terminal, and second switching means connected to said second signal-receiving input means and to said first switching means to cause said first switching means to assume a third condition in response to the application of a signal to said second signal-receiving input means to provide a third output level at said output terminal, said output terminal exhibiting a high impedance relative to said first and second output levels.

2. A logic circuit as in claim 1 where said output terminal at said first and second output levels serves as a current sink or current source and at said third output level said output terminal provides a high output impedance.

3. A logic circuit as in claim 1 in which said first switching means includes first and second output means coupled to said output terminal in which for one of said two output levels one of said output means is active and the other inactive and for said other of said two output levels the other of said output means is active and the one is inactive and in which for said third output level said second switching means inactivates both of said output means.

4. A logic circuit as in claim 3 in which said first and second output means includes first and second transistors respectively, said first transistor being coupled to a third transistor and said second transistor being coupled to a fourth transistor, said second switching means when said logic circuit is in said third output level providing a low impedance path-shunting current from an input terminal of said third transistor to inactivate said first transistor and in addition shunting current from an output terminal of said fourth transistor to inactivate said second transistor.

*5. A system comprising a plurality of logic circuits as claimed in claim 1, a common line, and means connecting the respective output terminals of said plurality of logic circuits to said common line.*

*6. In a logic circuit having first and second signal-receiving input means and an output terminal, said output terminal being adapted to be connected to a driven logic circuit, first switching means connected to said first signal-receiving input means and to said output terminal for selectively switching between first and second conditions in response to application of a signal to the first signal-receiving input means to provide first or second output levels respectively at said output terminal, and second switching means connected to said second signal-receiving input means and to said first switching means to cause said first switching means to assume a third condition in response to the application of a signal to said second signal-receiving input means to provide a third output level at said output terminal, said third output level at said output terminal exhibiting a high impedance relative to said first and second output levels, said first switching means including first and second output means coupled to said output terminal such that to provide one of said first and second output levels one of said output means is rendered active and the other rendered inactive and to provide the other of said first and second output levels the other of said output means is rendered active and the said one is rendered inactive and such that to provide said third output level said second switching means inactivates both of said output means.*

*7. A logic circuit as claimed in claim 6, in which said first and second output means includes respectively first*

*and second transistors having their main current paths connected in series, a third transistor coupled to said first and second transistors for selectively activating and inactivating said first and second transistors respectively in response to application of a signal to the first signal-receiving input means and for inactivating and activating said first and second transistors respectively in response to application of a different signal to the first signal-receiving input means, and means coupling said second switching means to both said first and second transistors to inactivate both said first and second transistors simultaneously in response to a signal applied to said second signal-receiving input means to provide said third output level.*

*8. A logic circuit as claimed in claim 7 wherein said means coupling said second switching means to both said first and second transistors includes said third transistor.*

*9. A system comprising a plurality of logic circuits as claimed in claim 7, a common line, and means connecting the respective output terminals of said plurality of logic circuits to said common line.*

* * * * *